(12) United States Patent
Tsunoda et al.

(10) Patent No.: US 6,446,345 B1
(45) Date of Patent: Sep. 10, 2002

(54) ROTARY CUTTER FOR MOWER

(75) Inventors: Shuhei Tsunoda; Keizo Shimizu, both of Gunma Prefecture; Minoru Shibazaki, Yoshioka-machi; Hideki Hashiba, Takasaki, all of (JP)

(73) Assignee: Starting Industrial Co., Ltd., Tokyo (JP)

( * ) Notice: Subject to any disclaimer, the term of this patent is extended or adjusted under 35 U.S.C. 154(b) by 0 days.

(21) Appl. No.: 09/444,839

(22) Filed: Nov. 22, 1999

(30) Foreign Application Priority Data

Nov. 24, 1998 (JP) .............................. 10-332690

(51) Int. Cl.⁷ ..................... A01D 34/416; B65B 7/00; B26D 1/12
(52) U.S. Cl. ..................... 30/276; 30/347; 56/12.7; 56/295
(58) Field of Search ................. 30/276, 272.1, 30/347; 56/12.7, 295; 172/13, 41, 110, 111

(56) References Cited

U.S. PATENT DOCUMENTS

| | | | | |
|---|---|---|---|---|
| 4,211,005 A | * | 7/1980 | Woods | 30/276 |
| 4,347,666 A | * | 9/1982 | Moore | 30/276 |
| 4,412,382 A | * | 11/1983 | White, III | 30/276 |
| 4,426,780 A | * | 1/1984 | Foster | 30/276 |
| 4,651,421 A | * | 3/1987 | Zerrer | 30/347 |
| 4,866,846 A | * | 9/1989 | Hoffman et al. | 30/276 |
| 4,989,321 A | * | 2/1991 | Hoffmann | 30/276 |
| 5,020,223 A | * | 6/1991 | Desent et al. | 30/276 |
| 5,311,665 A | * | 5/1994 | Sugihara et al. | 30/276 |
| 5,526,572 A | * | 6/1996 | Sugihara et al. | 30/276 |
| 5,881,464 A | * | 3/1999 | Collins et al. | 30/276 |
| 5,906,051 A | * | 5/1999 | Nannen | 30/276 |

* cited by examiner

Primary Examiner—Boyer Ashley
(74) Attorney, Agent, or Firm—Breiner & Breiner, L.L.C.

(57) ABSTRACT

A rotary cutter for a mower capable of limiting the reeling out of a cord, when the free end of the cord is worn out to only when the rotary cutter is rotated at low speed thereby preventing pebbles or the like from being scattered. The rotary cutter is disengaged without the component parts being separated thereby facilitating reassembly. The rotary cutter includes a cord for mowing grass on being rotated, a reel for containing the cord and reeling out the cord intermittently while being rotated, a cover covering a case containing the reel, and a plunger projected downward from the case and movable in an axial direction by being pressed for intermittently rotating the reel. A ratchet is held at a constant position by an urging element which is moved outward to open against the direction of the urging element by the centrifugal force produced by rotating the rotary cutter at a high speed and is engaged with the plunger to thereby prevent the plunger from moving in the axial direction. The urging element includes a return spring urging the plunger in an outer direction. The reel and the plunger are separate members contained in the case and cover and are detachably connected to each other, the reel being intermittently rotated by moving the plunger in the axial direction and the case and the reel separating from the plunger when the case and the cover are detached from each other.

4 Claims, 5 Drawing Sheets

ROTARY CUTTER FOR MOWER

FIELD OF INVENTION

The present invention relates to a rotary cutter for a mower for mowing grass or the like by a cord extending in a radial direction from a case and being rotated by a motor or the like via a shaft.

BACKGROUND OF THE INVENTION

Conventionally, according to technology of this kind, there is constructed a system containing a cord on a reel, in which when a free end of the cord is worn out, methods of then reeling out the cord, includes stopping the engine, partially disassembling the rotating parts and loosening screws. Alternatively, there is fabricated a structure in which a plunger for moving the reel in an axial direction is provided at the front end of a shaft to which the cutter is attached and by pushing in the plunger while rotating, the reel and the housing are shifted with respect to each other to thereby reel out the cord as shown by Japanese Patent Laid-Open No. 5608/1982.

However, the conventional rotary cutters having the above-described constitutions pose the following problems: in the case of the former, the operation of reeling out the cord is extremely complicated, and in the case of the latter, the lever is struck to push it in while rotating, which is dangerous since the free end of the cord is thereby lowered and pebbles are scattered by the cord. Further, all parts are separated when disassembling the rotary cutter which is an extremely troublesome procedure, and scrupulous caution is required in reassembling them.

SUMMARY OF THE INVENTION

It is an object of the invention to provide a rotary cutter for a mower resolving the problems of the conventional technology, mentioned above, and which is capable of limiting operation of the reeling out of the cord in the case where the free end of the cord is worn out to only when the rotary cutter is rotating at low speed, so that pebbles or the like will not be scattered. A further object of the invention is to provide a rotary cutter for a mower capable of preventing all parts from being scattered when disengaging the rotary cutter and accordingly, facilitating reassembly.

In order to achieve the above-described objects, according to an aspect of the invention, there is provided a rotary cutter for a mower including a cord for mowing grass, upon rotation, a reel for taking in the cord and reeling out the cord intermittently, when the reel is rotated, a cover covering a case containing the reel, and a plunger projected downward from the case and movable in an axial direction with pressure for intermittently rotating the reel, wherein a ratchet held at a constant position by an urging means is moved outward to open against the direction of the urging means by centrifugal force which is produced by rotating the rotary cutter at a high speed and engaged with the plunger to thereby prevent the plunger from moving in an axial direction. The urging means comprises a return spring for pushing the plunger in an outward direction, and the reel and the plunger which are separate members are contained in the case and the cover which are connected to each other detachably. The reel is intermittently rotated by moving the plunger in an axial direction, and when the case and the cover are detached from each other, the case and the reel are separated from the plunger.

Further, according to another aspect of the invention, there is further provided an engaging means with a shaft fixed to a main body of the mower at a central portion of the cover for holding the plunger by the shaft.

DETAILED DESCRIPTION OF THE PREFERRED EMBODIMENTS

Figure 1:
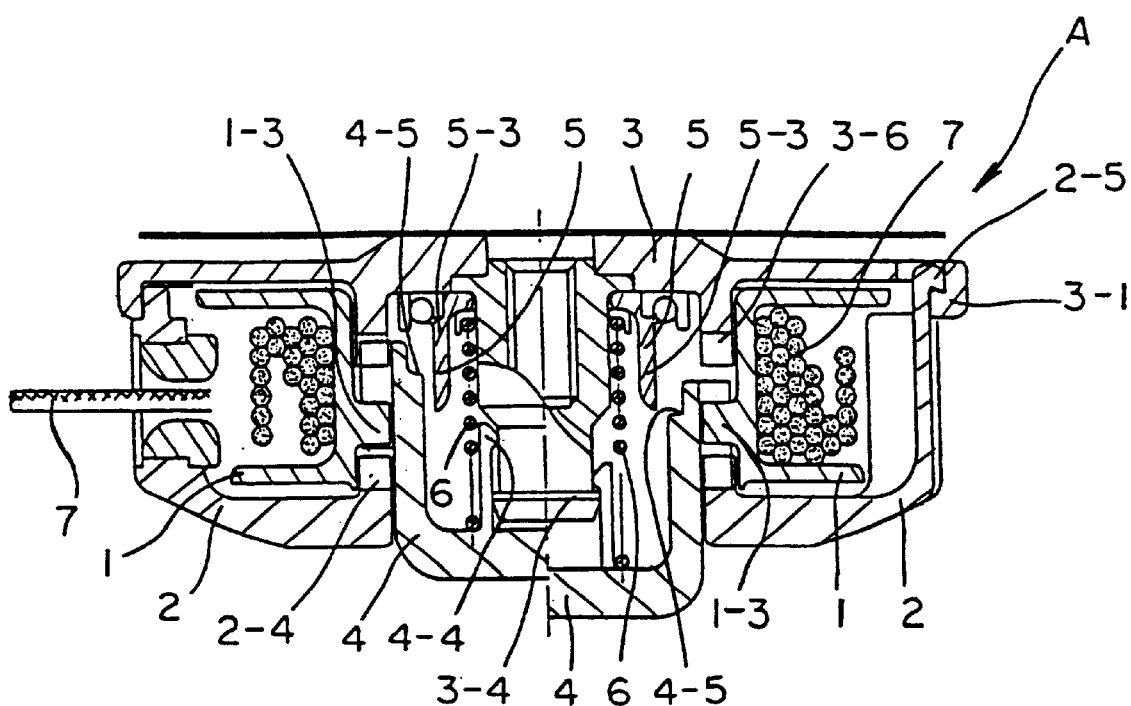
FIG. 1 is a view showing a rotary cutter for a mower according to an embodiment of the invention when the rotary cutter is rotated at a low speed and is a sectional view showing the state in which the plunger is not pressed on the right side of the drawing and showing the state where it is pressed on the left side.

According to the invention, a reel 1 having a recess groove 1-1 containing a cord 7, made from nylon or the like at its outer peripheral portion and having means (not illustrated) for fixing a central portion of the cord (when a one piece cord is used) or one end portion thereof (when two pieces of cord are used) and a plurality of projections 1-3 provided at equal intervals to project inwardly from the inner peripheral face of reel 1 through hole 1-2 provided at the center, rotates in a case 2 in the shape of a bottom cylinder member. The case 2 is provided with outlets 2-1 for leading out the cord 7 in the direction of the outer peripheral face thereof opposed to each other around the periphery, and a circular hole 2-3 is perforated at a central portion of the bottom portion 2-2.

Further, a hook 2-5 is provided at the edge portion of the case 2 to direct outwardly, and the hook 2-5 is constituted to be able to be engaged with a jaw portion 3-1 extended downwardly at the outer peripheral edge portion of a cover 3, jaw portion 3-1 being able to cover an entire face of the edge portion of the case 2. That is, by engaging the hook 2-5 with the jaw portion 3-1, the cover 3 is detachably connected to the case 2 and a housing A is constituted by the case 2 and the cover 3.

Further, a shaft 3-2 extended downwardly is fixed to a central portion of the cover 3 and the shaft 3-2 is provided with a screw portion 3-3 attached by screwing the shaft portion (not illustrated) of the main body of the mower.

Meanwhile, the inside of the housing A formed by the case 2 and the cover 3 is occupied by a plunger 4 constituted by a bottom cylinder member fitted into the through hole 1-2 of the reel 1 and urged by a return spring 6 to project its bottom portion through the circular hole 2-3 of the case 2, the outer peripheral face of the plunger 4 being provided with a plurality of projections 4-1 projected outwardly similarly at equal intervals in correspondence with the projections 1-3 provided at the inner peripheral face of the reel 1. Further, a plurality of elastic ribs 4-3 in an arm-like shape are projected from a bottom portion 4-2 of the plunger 4 in the axial direction and claw portions 4-4 provided at the free ends of the ribs 4-3 are engaged with a projected portion 3-4 in a ring-like shape provided at a lower end portion of the shaft 3-2 of the cover 3.

Further, the return spring 6 is expanded such that one end thereof is brought into contact with the bottom portion 4-2 of the plunger 4 to thereby urge the plunger 4 downwardly while the other end thereof is brought into contact with a short arm portion 5-2 of an L-shaped rachet 5 axially attached rotatably to the cover 3 via a support shaft 5-1. Therefore, according to the L-shaped ratchet 5, a long arm portion 5-3 thereof is disposed in parallel with the shaft 3-2 of the cover 3 so far as centrifugal force produced by high speed rotation is not exerted to the housing A comprising the case 2 and the cover 3 (refer to FIG. 1). When the housing A is rotated at high speed, the centrifugal force is brought to bear on the long side portion 5-3 against the return spring 6, and a free end 5-4 of the long side portion 5-3 is moved outward and expanded to open in the diameter direction to thereby engage with a stepped portion 4-5 in a ring-like shape provided at the inner peripheral face of the open end portion of the plunger 4 (refer to FIG. 2).

Further, the inner side of the cover 3 and the inner side of the case 2 are respectively provided with several projected portions 3-6 and 2-4 at equal intervals in the axial direction such that although their positions can be shifted in the circumferential direction relative to the positions of the projections 4-1 of the plunger 4 and the projections 1-3 of the reel 1, the phases are matched therewith in the axial direction. That is, the projected portions 3-6 and the projected portions 2-4, are arranged at intervals in the least larger of the widths in the circumferential direction of the projections 4-1 of the plunger 4 or the projections 1-3 of the reel 1.

An explanation will be given as follows of the operation of the invention having such a constitution.

Figure 2:
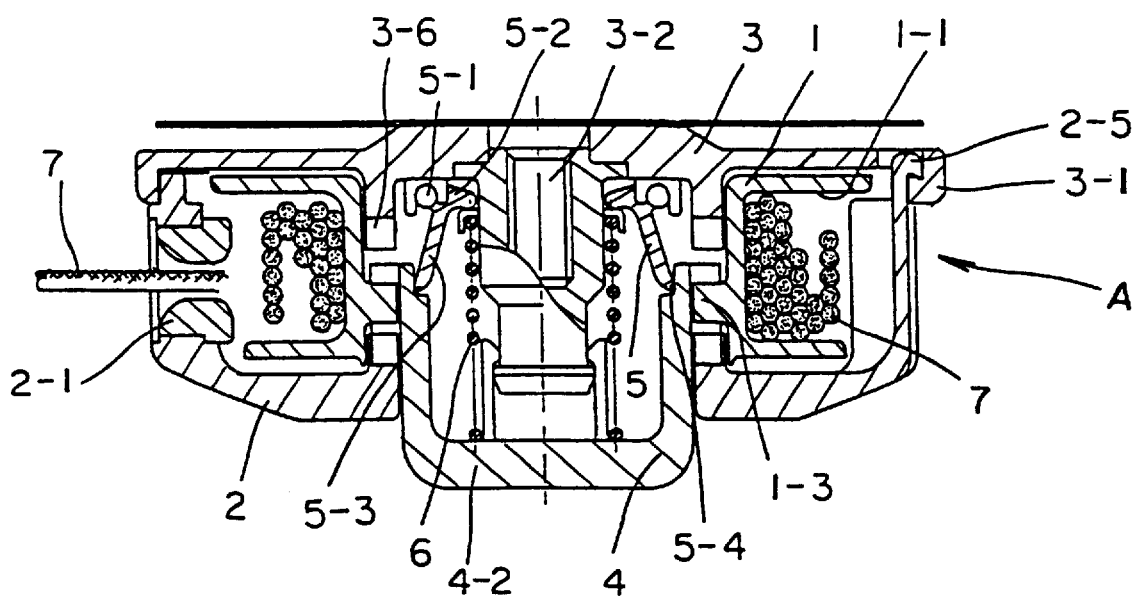
FIG. 2 is a sectional view showing the state in which the rotary cutter for a mower according to the embodiment of the invention is rotated at a high speed.

First, when the mower is brought into a nonoperational state or a low-speed rotational state, as shown by FIG. 1, there is brought about a state in which the plunger 4 is urged downwardly by the return spring 6, and the projected portion 3-4 in the ring-like shape of the cover 3 is engaged with the claw portions 4-4, which operate as stopping means for preventing the plunger 4 from moving further downward. In this case, the urging force of the return spring 6 operates on the short side portion 5-2 of the ratchet 5 to thereby hold the long side portion 5-3 of the ratchet in the direction in parallel with the shaft 3-2 of the cover 3. Next, when the mower starts rotating at high speed, by rotation, the whole cover 3 is rotated via the shaft 3-2. The case 2 is also rotated along with the cover 3 because of the engagement between the jaw portion 3-1 and the hook 2-5. The rotation is transmitted to the projections 4-1 and 1-3 which are brought into contact with each other via the projected portions 2-4 of the case 2, and the reel 1 is rotated integrally with the housing A. By rotating the reel 1, the cord 7 fixed to the recess groove 1-1 and extended from the outlet 2-1 is rotated by which turf or weed or the like can be mown by its free end portion.

When the housing A comprising the case 2 and the cover 3 is rotated at high speed in this way, the centrifugal force is operated on the long side portion 5-3 of the ratchet 5. The free end 5-4 of the long side portion 5-3 is expanded to open outwardly in the diameter direction against the return spring 6 and engaged with the stepped portion 4-5 of the plunger 4 to thereby bring about the state shown by FIG. 2 and accordingly, even when the plunger 4 is struck on its protruding face, the plunger 4 cannot be moved up.

Figure 3:
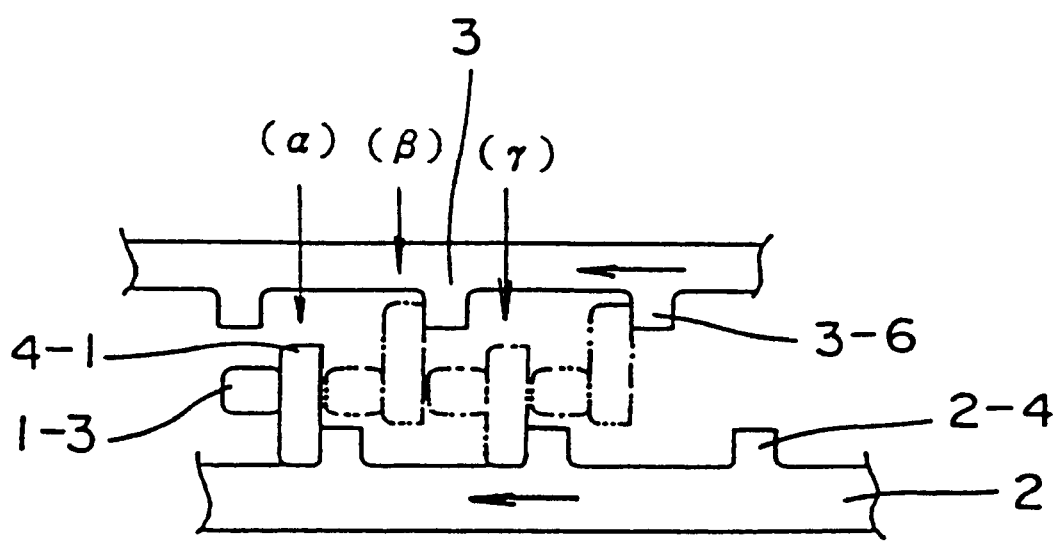
FIG. 3 is an explanatory view showing a state in which the reel of the rotary cutter for a mower according to the embodiment of the invention, is reeled out.
Figure 4:
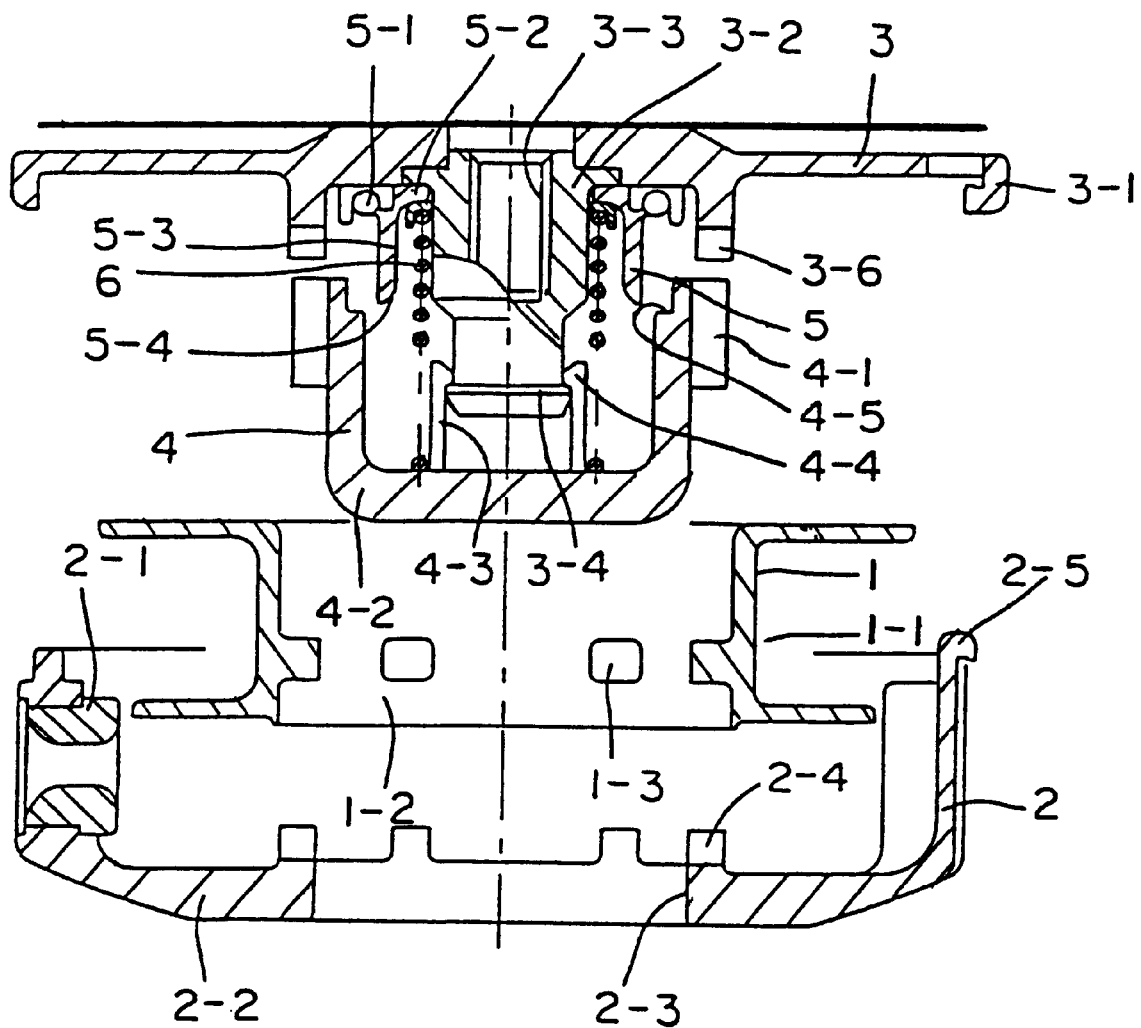
FIG. 4 is a disassembled sectional view of the rotary cutter for a mower according to the embodiment of the invention.
Figure 5:
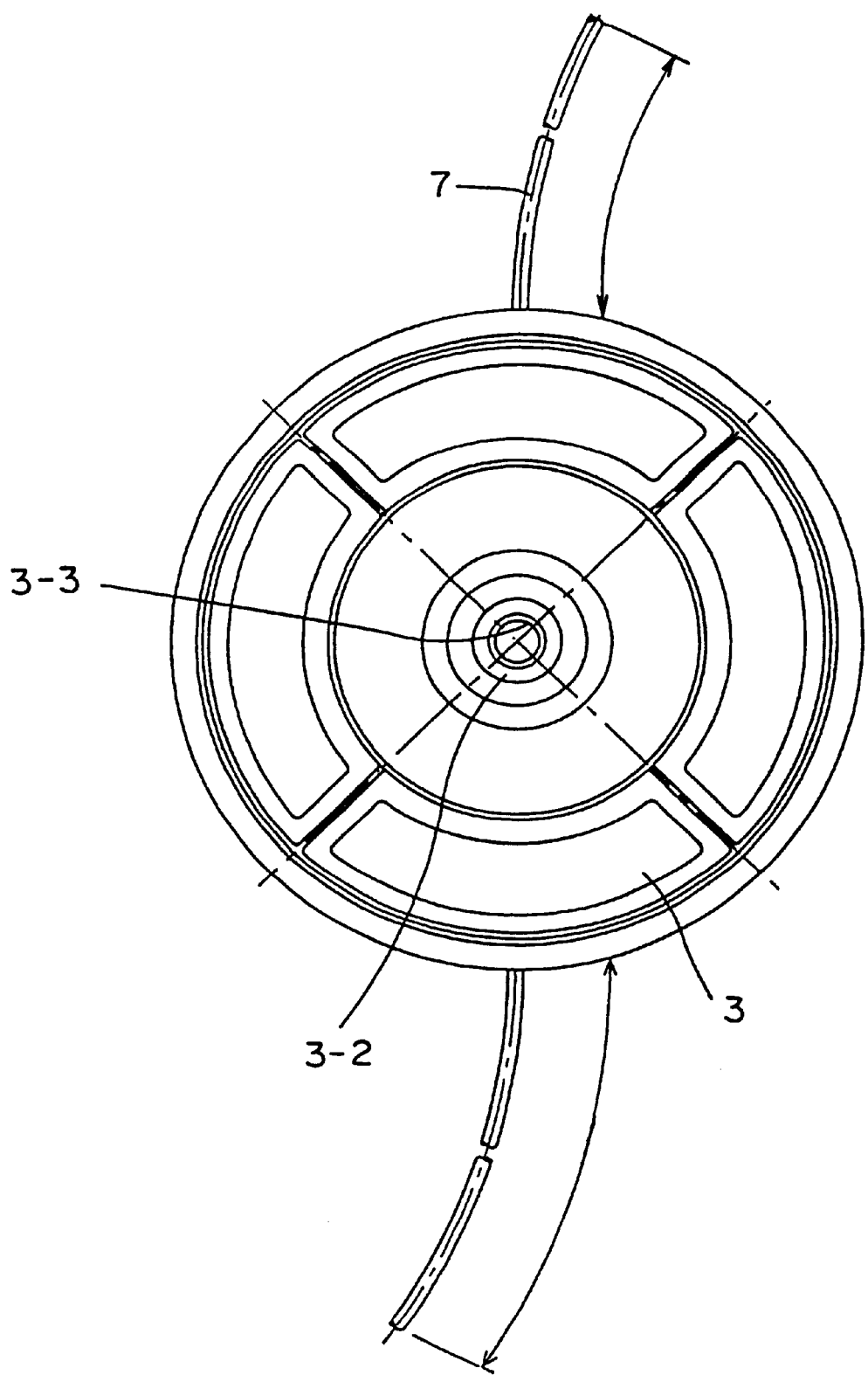
FIG. 5 is a view from above the rotary cutter for a mower according to the embodiment of the invention.

Meanwhile, in the case in which the free end side of the used cord 7 is worn out by mowing operations or the like and needs to be reeled out from the reel 1, the housing A is rotated at low speed so that the centrifugal force is not operated on the long side portion 5-3 of the ratchet 5, and the long side portion is maintained in a state in parallel with the shaft 3-2 of the cover 3, shown as ($\alpha$) position in FIG. 3. If the plunger 4 is struck on its protruding face as shown by the left side of FIG. 1, the plunger 4 is moved upwardly against the return spring 6.

At this occasion, with the lift of the plunger 4, the projection 4-1 is also lifted. However, by the centrifugal force operating on the cord 7 which is rotated at low speed, the projections 1-3 which are brought into contact with the projections 4-1 ride over the projections 2-4 of the case 2 and are brought into contact with the projections 3-6 of the cover 3 shown as ($\beta$) position in FIG. 3. Successively, by the return force of the return spring 6, the plunger 4 is moved down, and the projections 4-1 of the plunger 4 are moved further by the projections 1-3 of the reel 1 and brought into contact with the next projections 2-4 of the case 2 shown as ($\gamma$) position in FIG. 3. That is, reel 1 is rotated for a short period by the ($\alpha$) distance of the interval between the projected portions 2-4 of the case 2.

In this way, when the housing A is rotated at low speed, every time the plunger 4 is struck on the protruding face, the cord 7 is reeled out from the reel 1 by a length in correspondence with a peripheral length of the interval between the projections 2-4, and when an operator strikes the plunger 4 on the protruding face a desired number of times, a desired length of the cord 7 is reeled out.

Next, when the cord 7 of the rotary cutter of the mower according to the invention is worn out and needs to be interchanged or when the rotary cutter needs to be disassembled to component parts of the inner portion for interchanging and maintenance, first, the engagement between the jaw portion 3-1 of the cover 3 and the hook 2-5 of the case 2 is disengaged, and the case 2 can be detached therefrom in the downward direction. Successively, the reel 1 may be detached from the plunger 4, and the cord 7 may be interchanged. On this occasion, the plunger 4 engaged with the return spring 6 and the L-shaped ratchet 5 are not separated because of the engagement between the claw portions 4-4 at the end portions of the arm-like elastic ribs 4-3 of the plunger 4 and the projected portion 3-4 in the ring-like shape of the shaft 3-2 and accordingly, reassembly is extremely facilitated. Further, in order to exchange the return spring 6 or the L-shaped ratchet 5 disposed inside of the plunger 4, engagement between the claw portions 4-4 and the ring-shaped projected portions 3-4 is released by strongly pulling down the plunger 4 and bending the arm-like elastic ribs 4-3 in the arm-like shape, so that the plunger 4 can be detached from the shaft 3-2.

Further, when the plunger 4 is to be reintegrated to the shaft 3-2, after mounting the ratchet 5 and the return spring 6, the plunger 4 is pushed on the downward side in the axial direction of the shaft 3-2. In the reverse operation of the above-described, the elastic ribs 4-3 in the arm-like shape are bent, and the claw portions 4-4 are moved outward to open around the projection 3-4 in the ring-like shape and successively ride over the projected portion 3-4. Thereafter, by elasticity of the elastic ribs 4-3, the original state is recovered, and the engaged state can be brought about.

As stated above, according to the invention, the operation of reeling out the cord when the free end of the cord is worn out, can be carried out only when the rotary cutter is rotated at low speed and therefore, scattering of pebbles or the like is prevented. Further, in disengaging the rotary cutter, respective parts are not separated from each other and accordingly, there can be provided a rotary cutter for a mower which is easy to reassemble.

What is claimed is:

1. A rotary cutter for a mower comprising:

a cord for mowing grass upon rotation of the cord;

a reel for intermittently winding up and feeding out the cord;

a cover covering a case which contains the reel; and a plunger constructed and arranged to move in an axial direction upon being pressed downward by an urging means biased against a ratchet to project the plunger outward from the case;

wherein the ratchet has a first side portion structured to engage the plunger upon operation of a centrifugal force on said first side portion upon rotation of the rotary cutter, and a second side portion positioned between the urging means and the cover.

2. The rotary cutter for a mower according to claim 1, wherein the urging means comprises a spring.

3. The rotary cutter for a mower according to claim 1, wherein the reel and the plunger constitute separate members and are contained in the case which has the cover removably connected thereto, the reel being constructed and arranged for intermittent rotation upon axial movement of the plunger, and wherein upon detachment of the case from the cover, the case and the reel are separated from the plunger.

4. The rotary cutter for a mower according to claim 3, further comprising:

engaging means having a shaft fixed to a main body of the mower at a central portion of the cover to hold the plunger against the shaft.

* * * * *